US011878313B2

(12) United States Patent
Yamamoto et al.

(10) Patent No.: US 11,878,313 B2
(45) Date of Patent: Jan. 23, 2024

(54) METHOD FOR FORMING PARTING LINE

(71) Applicant: TOYOTA JIDOSHA KABUSHIKI KAISHA, Toyota (JP)

(72) Inventors: Junya Yamamoto, Seto (JP); Tsuyoshi Kimura, Seto (JP); Kentaro Kizaki, Itami (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/945,217

(22) Filed: Sep. 15, 2022

(65) Prior Publication Data

US 2023/0098435 A1 Mar. 30, 2023

(30) Foreign Application Priority Data

Sep. 28, 2021 (JP) ................................. 2021-158520

(51) Int. Cl.

*B05D 1/32* (2006.01)
*B05D 7/14* (2006.01)
*B05B 12/24* (2018.01)
*B05D 3/12* (2006.01)
*B05D 7/16* (2006.01)

(52) U.S. Cl.

CPC .............. *B05B 12/24* (2018.02); *B05D 1/325* (2013.01); *B05D 3/12* (2013.01); *B05D 7/14* (2013.01); *B05D 7/16* (2013.01); *B05D 2350/33* (2013.01)

(58) Field of Classification Search

CPC ........ B05D 1/325; B05D 3/002; B05D 3/102; B05D 3/12; B05D 7/14; B05D 7/16; B05D 2202/00; B05D 2350/30; B05D 2350/33

USPC ................................. 427/272, 282, 299, 327

See application file for complete search history.

(56) References Cited

U.S. PATENT DOCUMENTS

2014/0170362 A1* 6/2014 Ali ......................... C09J 133/14 428/354

FOREIGN PATENT DOCUMENTS

| | | | | | |
|---|---|---|---|---|---|
| CN | 108672251 | A | * | 10/2018 | |
| JP | S60-110380 | A | | 6/1985 | |
| JP | H0-494766 | A | | 3/1992 | |
| JP | H06-238209 | A | | 8/1994 | |
| JP | 2009-266766 | A | | 11/2009 | |
| JP | 2018-90730 | A | | 6/2018 | |
| KR | 20100001926 | U | * | 2/2010 | B05B 12/24 |

* cited by examiner

*Primary Examiner* — William P Fletcher, III

(74) *Attorney, Agent, or Firm* — Oliff PLC

(57) ABSTRACT

A method for forming a parting line in a coating using an easily peelable coating material comprising (i) attaching a masking tape to a part not to be coated on a boundary between a part to be coated and the part not to be coated along the boundary; (ii) performing a process to improve an adhesiveness with an easily peelable coating material on surfaces of a part in contact with the boundary of the part to be coated and/or a part in contact with the boundary of the masking tape; (iii) applying the easily peelable coating material over surfaces of the part to be coated and the part in contact with the boundary of the masking tape; and (iv) peeling off the masking tape.

4 Claims, 3 Drawing Sheets

Pull Direction: 135°

Pull Direction: 225°

Pull Direction: 90°

Pull Direction: 180°

METHOD FOR FORMING PARTING LINE

CROSS REFERENCE TO RELATED APPLICATIONS

The present application claims priority from Japanese patent application JP 2021-158520 filed on Sep. 28, 2021, the entire content of which is hereby incorporated by reference into this application.

BACKGROUND

Technical Field

The present disclosure relates to a method for forming a parting line, specifically, a method for forming a parting line in a coating using an easily peelable coating material.

Description of Related Art

For vehicles, such as an automobile, as a measure for improving the designability of exterior parts, such as a front panel and a pillar, for example, a partial black coating, a metallic two-tone color coating, and a stripe coating have been performed.

In forming such various designs, it is important for an excellent designability to form a boundary between a coated part and a non-coated part, or a boundary between different colored coating films, that is, a parting line to be sharp and clear.

For example, JP H04-94766 A discloses a coating method for a parting part in which when a plurality of different colors are separately coated on a coated surface of an object to be coated, a masking is attached to an already coated surface of the object to be coated to cover a necessary part, and a different color is separately coated on the other part excluding the covered part. In the coating method for a parting part, the masking includes an upper tape and a lower tape which are mutually attached. In one end portion of both tapes, a stepped portion is formed in a state where the lower tape is positioned inside with respect to the upper tape. In the separately coating, the stepped portion is positioned at the parting part, the lower tape side is attached to the already coated surface, and subsequently, a clear coating material is applied over a part excluding the masking. Next, only the upper tape is peeled, and subsequently, a color base coating material is applied over a part excluding the lower tape to cover the end portion of the clear coating material with the color base coating material.

JP 2018-90730 A discloses a method for forming a coating film using a masking tape. The masking tape includes at least a substrate, a linear body, and an adhesive layer. The substrate includes a polymer film extending in a longitudinal direction of the masking tape. The linear body is disposed to be parallel to an end side as an end in a width direction of the masking tape. The method includes at least steps (1) to (5) below: (1) a step of covering a masking region using a masking tape, or covering the masking region with a masking sheet while securing an end portion of the masking sheet to an edge of the masking region using the masking tape, or covering the masking region with a masking sheet with a masking tape using the masking tape in which the masking sheet with the masking tape is preliminarily disposed; (2) a step of forming a first coating film in the region to be coated; (3) a step of removing an unnecessary coating film together with the substrate in contact with the linear body by pulling up the linear body from the masking tape to cut out the coating film immediately above the linear body, or removing an unnecessary coating film by pulling up the end side of the masking tape with respect to the linear body and the linear body itself to cut out the coating film immediately above the linear body and the coating film in the end side with respect to the linear body; (4) a step of forming an uppermost coating film in the region to be coated; and (5) a step of peeling off the masking tape or peeling off the masking tape and removing the masking sheet or the masking sheet with the masking tape.

SUMMARY

Nowadays, for expressing the individuality, opportunities of creating various designs have increased. Especially, the use of the two-tone colored design in which various two colors are combined as a design has increased.

In the coating method using an ordinary coating material, a parting line is formed as follows. A masking tape is attached to a part not to be coated on a boundary between a part to be coated and the part not to be coated along the boundary (that is, so as to be in contact with the boundary), and a coating material is applied over surfaces of the part to be coated and a part in contact with the boundary of the masking tape to make the boundary clear by sufficiently applying the coating material over the part to be coated, especially the part in contact with the boundary of the part to be coated, and the masking tape is peeled off after the coating material is hardened by drying and the like, thus forming the parting line.

FIG. 1 schematically illustrates an exemplary coating method using an ordinary coating material. In FIG. 1, first, in (1) masking step, a masking tape 2 is attached to a part not to be coated on a boundary between a part to be coated and the part not to be coated of a foundation layer 1 along the boundary, in (2) coating material applying step, a coating material 3 is applied over surfaces of the part to be coated of the foundation layer 1 and a part in contact with the boundary of the masking tape 2 by spraying or the like, in (3) hardening step, the coating material 3 is hardened by drying or the like to form a coating film 4, and in (4) masking peeling off step, the masking tape 2 is peeled off, thus completing the coating.

However, when the above-described coating method is applied to a case of using an easily peelable coating material, by the step of peeling off the masking tape, the easily peelable coating material that is adhered to the masking tape and is on the surface of the part in contact with the boundary of the coated part is also peeled off together with the masking tape. Therefore, it is difficult to form a clear parting line.

Accordingly, the present disclosure provides a method for forming a parting line when an easily peelable coating material is used as a coating material.

The inventors examined various means to solve the problem, and found the following. In a method for forming a parting line in a coating using an easily peelable coating material, the method including: a step of attaching a masking tape on a part not to be coated on a boundary between a part to be coated and the part not to be coated along the boundary (that is, so as to be in contact with the boundary); a step of applying the easily peelable coating material over surfaces of the part to be coated and a part in contact with the boundary of the masking tape by sufficiently applying the coating material over the part to be coated, especially, a part in contact with the boundary of the part to be coated to make the boundary clear and to clearly form a parting design; and a step of peeling off the masking tape, by controlling a direction to peel off the masking tape in the step of peeling off the masking tape, or by improving the adhesiveness between the surfaces of the part in contact with the boundary of the part to be coated and/or the part in contact with the boundary of the masking tape and the easily peelable coating material before the step of applying the easily peelable coating material, it can be avoided that the easily peelable coating material is peeled off together with the masking tape when the masking tape is peeled off. Thus, the inventors achieved the present disclosure.

That is, the gist of the present disclosure is as follows.

(1) The present disclosure is a method for forming a parting line in a coating using an easily peelable coating material. The method comprises:

(I) attaching a masking tape on a part not to be coated on a boundary between a part to be coated and the part not to be coated, along the boundary;

(II) applying the easily peelable coating material over surfaces of the part to be coated and a part in contact with the boundary of the masking tape; and (III) peeling off the masking tape along a parting line in a pull direction of from 160° to 200° with a pull angle of from 160° to 180°.

(2) The present disclosure is a method for forming a parting line in a coating using an easily peelable coating material. The method comprises:

(i) attaching a masking tape on a part not to be coated on a boundary between a part to be coated and the part not to be coated along the boundary;

(ii) performing a process to improve an adhesiveness with the easily peelable coating material on a surface of a part in contact with the boundary of the part to be coated and/or a part in contact with the boundary of the masking tape;

(iii) applying the easily peelable coating material over surfaces of the part to be coated and the part in contact with the boundary of the masking tape; and (iv) peeling off the masking tape.

(3) In the method according to (2), in the step (ii), the process to improve the adhesiveness with the easily peelable coating material is an adhesive application process and/or a roughening process.

(4) In the method according to (3), in the step (ii), the process to improve the adhesiveness with the easily peelable coating material is the roughening process.

(5) In the method according to any one of (2) to (4), in the step (ii), the surfaces of the part in contact with the boundary of the part to be coated and the part in contact with the boundary of the masking tape are processed.

(6) In the method according to any one of (2) to (4), in the step (ii), the surface of the part in contact with the boundary of the masking tape is processed.

(7) In the method according to any one of (2) to (6), the step (iii) includes half-hardening or hardening the easily peelable coating material and cooling the easily peelable coating material.

(8) In the method according to any one of (2) to (7), in the step (iv), the masking tape is peeled off along the parting line in a pull direction of from 160° to 200° with a pull angle of from 160° to 180°.

The present disclosure provides the method for forming the parting line when the easily peelable coating material is used as the coating material.

DETAILED DESCRIPTION OF THE EMBODIMENTS

Figure 1:
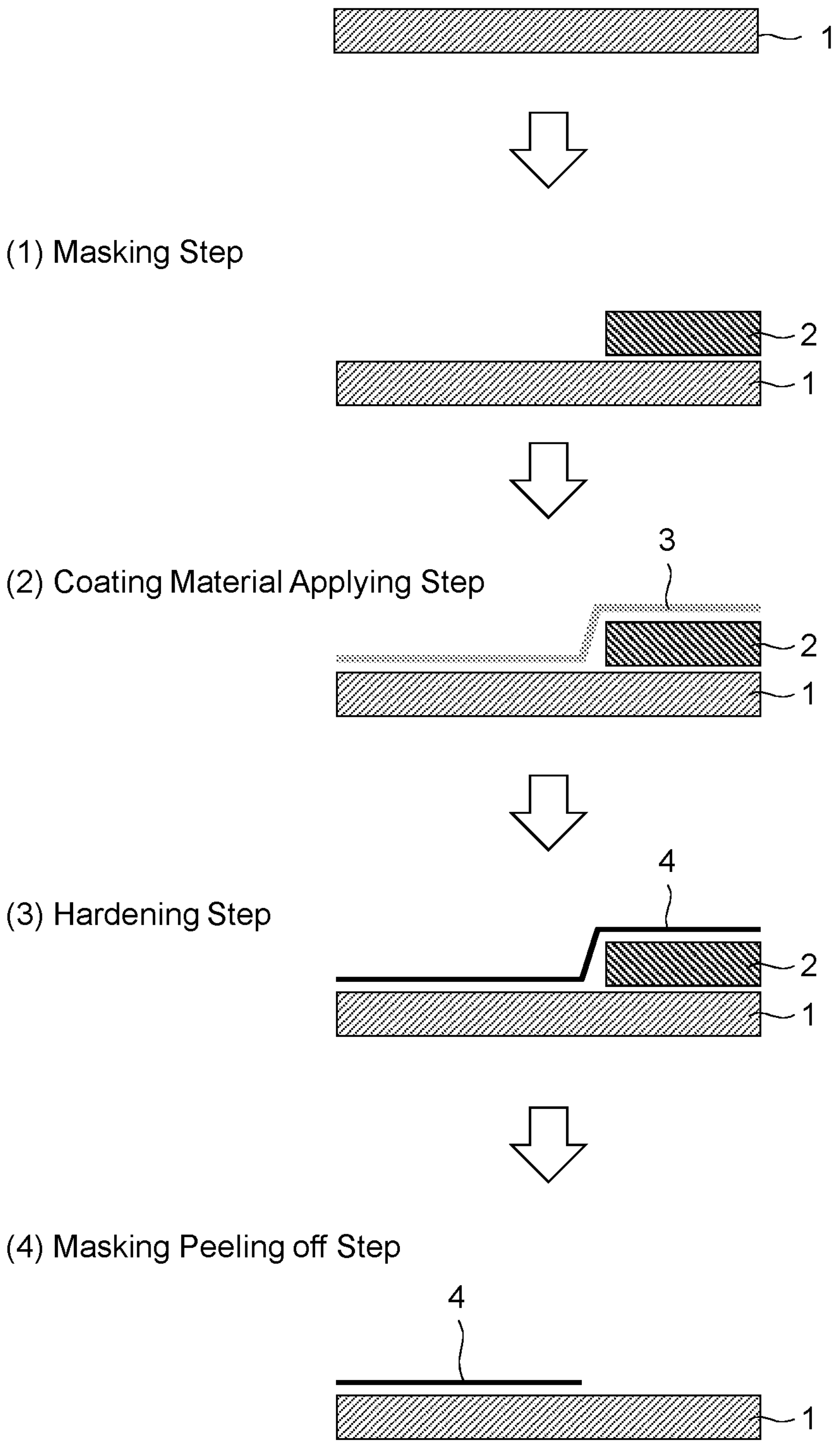
FIG. 1 is a drawing schematically illustrating an exemplary coating method using an ordinary coating material.

The following describes embodiments of the present disclosure in detail.

In the description, features of the present disclosure will be described with reference to the drawings as necessary. In the drawings, dimensions and shapes of respective components are exaggerated for clarification, and actual dimensions or shapes are not accurately illustrated. Accordingly, the technical scope of the present disclosure is not limited to the dimensions and the shapes of respective components illustrated in the drawings. Note that, a method for forming a parting line of the present disclosure is not limited to the embodiments below, and can be performed in various configurations where changes, improvements, and the like which a person skilled in the art can make are given without departing from the gist of the present disclosure.

The present disclosure relates to a method for forming a parting line in a coating using an easily peelable coating material, the method including (I) a step of attaching a masking tape on a part not to be coated on a boundary between a part to be coated and the part not to be coated along the boundary, (II) a step of applying the easily peelable coating material over surfaces of the part to be coated and a part in contact with the boundary of the masking tape, and (III) a step of peeling off the masking tape along the parting line in a pull direction of from 160° to 200° with a pull angle of from 160° to 180°.

The following describes each of the steps (I) to (III).

(I) Step of Attaching Masking Tape on Part not to be Coated on Boundary Between Part to be Coated and Part not to be Coated Along Boundary (Masking Step)

In the step (I), the masking tape is attached on the part not to be coated on the boundary between the part to be coated and the part not to be coated along the boundary, that is, so as to be in contact with the boundary.

The boundary between the part to be coated and the part not to be coated is a part at which the parting line is formed, and also referred to as a parting part.

The masking tape is a tape attached to a foundation layer to mask the part not to be coated, and peeled off after coating with the easily peelable coating material. While the foundation layer is not limited, a substrate or a material already coated over the substrate surface is included. Accordingly, the masking tape has an adhesive strength finally peelable from the foundation layer.

The masking tape includes masking tapes known in the technical field, and is not limited. The masking tape includes a paper masking tape or a plastic masking tape. As the masking tape, a masking tape of a hard layer, for example, a plastic masking tape or an acrylic masking tape is used in some embodiments.

With the masking tape having a hard layer, the more distinct, sharp, and clear parting line can be formed in the step (III) described below.

While the thickness of the masking tape is not limited, the thickness of the masking tape is usually from 10 μm to 200 μm, and from 50 μm to 150 μm in some embodiments.

As described above, since the masking tape is finally peeled off from the foundation layer, the foundation layer and the masking tape directly in contact with the foundation layer are adhered to each other with a peelable adhesive strength. The adhesive having such an adhesive strength is publicly known in the technical field, and not limited.

(II) Step of Applying Easily Peelable Coating Material Over Surfaces of Part to be Coated and Part in Contact with Boundary of Masking Tape (Easily Peelable Coating Material Applying Step)

In the step (II), the easily peelable coating material is applied over the surfaces of the part to be coated and the part in contact with the boundary of the masking tape.

The easily peelable coating material includes a coating material known in the technical field, and is not limited. The easily peelable coating material includes, for example, a coating material selected from the group consisting of coating materials containing volatile solvents. Examples of the easily peelable coating material include a coating material containing an organic solvent, for example, xylene, ethylbenzene, and/or methyl ethyl ketone, an antioxidant, a silica reactant, a pigment, for example, titanium oxide (nanoparticles), and/or the like.

A method for applying the easily peelable coating material includes an applying method known in the technical field, and is not limited. Examples of the applying method include a manual application using a brush, a roller brush, a spatula, or the like, an application by equipment operation using an air spray, an airless spray, immersion, or the like, an application by device operation using adsorption by electrical attraction (electrostatic action).

In the step (II), the easily peelable coating material is applied by a method with which the easily peelable coating material is uniformly and sufficiently applied over the part to be coated, especially, a part in contact with the parting part of the part to be coated in some embodiments.

The thickness of applying the easily peelable coating material is not limited. The easily peelable coating material is applied such that the thickness of the coating film after hardening the easily peelable coating material is usually from 20 μm to 150 μm, and from 40 μm to 80 μm in some embodiments.

By applying the easily peelable coating material in the step (II), the easily peelable coating material is applied over the surfaces of the part to be coated and a part of the masking tape attached in the step (I), especially the part in contact with the parting part of the masking tape.

The step (II) may further include (II') a step of half-hardening or hardening the easily peelable coating material to decrease the fluidity (to increase the viscosity) of the easily peelable coating material.

The step of half-hardening or hardening the easily peelable coating material, that is, the step (II') can differ depending on the property of the easily peelable coating material.

For example, when the easily peelable coating material contains a volatile solvent, for example, xylene, ethylbenzene, acetone, methyl ethyl ketone, or a mixed solvent of them, and the like, the step (II') can include a step of flashing-off (simply, a step of "flashing" in other words) or a step of drying to volatilize the solvents. While the step of flashing-off or the step of drying is not limited, the step of flashing-off or the step of drying can be performed in the atmosphere at usually from 15° C. to 100° C., from 20° C. to 100° C. in some embodiments, from 15° C. to 80° C. in some embodiments, from 15° C. to 60° C. in some embodiments, from 40° C. to 60° C. in some embodiments, and from 20° C. to 50° C. in some embodiments. While a flash-off time or a drying time in the step of flashing-off or the step of drying possibly depends on the temperature in the step of flashing-off or the step of drying, the flash-off time or the drying time may be set to be shorter, usually 30 minutes or less, and 10 minutes or less in some embodiments. Since the excessively short flash-off time or drying time fails to half-harden or harden the easily peelable coating material, the flash-off time or the drying time is usually 30 seconds or more, one minute or more in some embodiments, and three minutes or more in some embodiments. While the process may proceed to the step (III) directly, that is, in the state where the coating film is heated, after the step of flashing-off or the step of drying, the half-hardened or hardened easily peelable coating material (coating film) may be cooled to the room temperature (about 20° C. to 30° C.) from the aspect of stability of the coating film.

For example, the step (II') can include a heat treatment step when the easily peelable coating material contains a thermosetting resin. The heat treatment step is performed for a period at a temperature enough to half-harden or harden the easily peelable coating material. While the process may directly proceed to the step (III) after the heat treatment step, the half-hardened or hardened easily peelable coating material (coating film) may be cooled to the room temperature (about 20° C. to 30° C.) from the aspect of stability of the coating film.

For example, the step (II') can include a light irradiation step when the easily peelable coating material contains a photocurable resin. The irradiation step is performed with a light wavelength for a period enough to half-harden or harden the easily peelable coating material. While the process may directly proceed to the step (III) after the irradiation step, the half-hardened or hardened easily peelable coating material (coating film) may be cooled to the room temperature (about 20° C. to 30° C.) from the aspect of stability of the coating film.

When the step (II) further includes the step (II'), the fluidity of the easily peelable coating material is decreased (the viscosity is increased), and dropping of the easily peelable coating material on the foundation layer can be avoided even when the masking tape is peeled off in the step (III) described below.

(III) Step of Peeling Off Masking Tape (Masking Tape Peeling Off Step)

In the step (III), the masking tape is peeled off along the parting line in the pull direction of from 160° to 200°, and the pull direction of 180° (180° opposite direction) in some embodiments with the pull angle of from 160° to 180°, and the pull angle of 180° in some embodiments.

In the step (III), some embodiments in which "the masking tape is peeled off along the parting line in the pull direction of 180° with the pull angle of 180°" mean that, in other words, the masking tape is peeled off by holding up the end of the masking tape and folding back the masking tape in the pull direction of 180° (180° opposite direction) with the pull angle of 180° (in a state of lying in the opposite direction) along the parting line, that is, such that the peeled part of the masking tape is along a still adhering part of the masking tape.

The pull direction means an angle between the parting line formed by peeling off the masking tape and a part that was in contact with the parting line in the peeled part of the masking tape at a boundary (folded portion) between the peeled part and the unpeeled part of the masking tape on the parting line viewed from directly above the coated surface.

The pull angle means an angle between the distal end portion of the masking tape before peeled off and the distal end portion of the peeled masking tape at a boundary (folded portion) between the peeled part and the unpeeled part of the masking tape when the coated surface is viewed edge-on.

That is, "peeling off the masking tape in the pull direction of 180° with the pull angle of 180°" means that the peeled distal end portion of the masking tape is folded back so as to overlap the still adhering part of the masking tape, and peeled off in the lying state as it is.

By peeling off the masking tape in the step (III) of the present disclosure, the easily peelable coating material in the part in contact with the boundary of the part to be coated does not lift even when peeling off the masking tape, thus allowing the formation of the sharp and clear parting line.

Furthermore, the present disclosure relates to a method for forming a parting line in a coating using an easily peelable coating material, and the method includes: (i) attaching a masking tape on a part not to be coated on a boundary between a part to be coated and the part not to be coated along the boundary; (ii) performing a process to improve an adhesiveness with the easily peelable coating material on a surface of a part in contact with the boundary of the part to be coated and/or a part in contact with the boundary of the masking tape; (iii) applying the easily peelable coating material over surfaces of the part to be coated and the part in contact with the boundary of the masking tape; and (iv) peeling off the masking tape.

The following describes each of the steps (i) to (iv).

(i) Step of Attaching Masking Tape on Part not to be Coated on Boundary Between Part to be Coated and Part not to be Coated Along Boundary (Masking Step)

In the step (i), the masking tape is attached on the part not to be coated on the boundary between the part to be coated and the part not to be coated along the boundary, that is, so as to be in contact with the boundary.

The boundary between the part to be coated and the part not to be coated is, similarly to the above description, a part at which the parting line is formed, and also referred to as a parting part.

The masking tape is a tape attached to a foundation layer to mask the part not to be coated, and peeled off after coating with the easily peelable coating material similarly to the above description. While the foundation layer is not limited, for example, a substrate or a material already coated over the substrate surface is included. Accordingly, the masking tape has an adhesive strength finally peelable from the foundation layer.

The masking tape includes masking tapes known in the technical field, and is not limited. The masking tape includes a paper masking tape or a plastic masking tape. As the masking tape, for the process to improve the adhesiveness with the easily peelable coating material performed in the step (ii) described below, a masking tape of a hard layer, for example, a plastic masking tape or an acrylic masking tape is used in some embodiments.

With the masking tape having a hard layer, the more distinct, sharp, and clear parting line can be formed after peeling off the masking tape in the step (iv) described below.

While the thickness of the masking tape is not limited, the thickness of the masking tape is usually from 10 μm to 200 μm, and from 50 μm to 150 μm in some embodiments.

As described above, since the masking tape is finally peeled off from the foundation layer, the foundation layer and the masking tape directly in contact with the foundation layer are adhered to each other with a peelable adhesive strength. The adhesive having such an adhesive strength is publicly known in the technical field, and not limited.

(ii) Step of Performing Process to Improve Adhesiveness with Easily Peelable Coating Material on Surfaces of Part in Contact with Boundary of Part to be Coated and/or Part in Contact with Boundary of Masking Tape (Adhesiveness Improving Step)

In the step (ii), a process to improve the adhesiveness with the easily peelable coating material is performed on the surfaces of the part in contact with the boundary of the part to be coated and/or the part in contact with the boundary of the masking tape.

While the process to improve the adhesiveness with the easily peelable coating material is not limited insofar as the process is a technique known in the technical field for improving the adhesiveness (adherability, adhesion property) between the coating material and an object to be coated, for example, an adhesive application process and/or a roughening process is included.

The adhesive application process means a process of applying an adhesive over the surface of the object to be coated for improving the adhesiveness with the easily peelable coating material. The adhesive used for the adhesive application process includes an adhesive known in the technical field, for example, a PP primer.

The roughening process means a process of providing unevenness on the surface of the object to be coated to increase a contact area with the coating material on the object to be coated, thus improving the adhesiveness between the coating material and the object to be coated. The material used for the roughening process includes a material known in the technical field, for example, a sandpaper and a compound. The material used for the roughening process includes a sandpaper, for example, a sandpaper of from #2000 to #5000, a sandpaper of from #3000 to #5000 in some embodiments, and a sandpaper of #3000 in some embodiments.

In the process to improve the adhesiveness with the easily peelable coating material, the adhesive does not remain in the foundation layer over which the easily peelable coating material was applied after peeling off the easily peelable coating material in some embodiments. Accordingly, the process to improve the adhesiveness with the easily peelable coating material is the roughening process in some embodiments.

The process to improve the adhesiveness with the easily peelable coating material is performed on the surfaces of the part in contact with the boundary of the part to be coated and/or the part in contact with the boundary of the masking tape.

The surface of the part in contact with the boundary of the part to be coated means a surface of the part in contact with the boundary between the part to be coated and the part not to be coated, that is, a part in contact with the masking tape in the part to be coated, and is a surface region of a certain distance from the boundary in the part to be coated, for example, usually from 0 mm to 50 mm, and from 0 mm to 10 mm in some embodiments while not limited.

When the process to improve the adhesiveness with the easily peelable coating material is performed on the surface of the part in contact with the boundary of the part to be coated, the step (ii) may be performed before the step (i), or may be performed after the step (i). In considering the ease of performing the step (i), the step (ii) is performed after the step (i) in some embodiments.

The surface of the part in contact with the boundary of the masking tape means a surface of the part in contact with the boundary between the part to be coated and the part not to be coated, that is, a part in contact with the part to be coated in the masking tape, and is a surface region of a certain distance from the boundary in the masking tape, for example, usually from 0 mm to 50 mm, and from 0 mm to 10 mm in some embodiments while not limited.

When the process to improve the adhesiveness with the easily peelable coating material is performed on the surface of the part in contact with the boundary of the masking tape, the step (ii) may be performed before the step (i), or may be performed after the step (i). When the step (ii) is performed before the step (i), a masking tape on which the process to improve the adhesiveness with the easily peelable coating material is performed in advance may be used as the masking tape. However, in considering that the masking tape is stored to be wound around a core material, the masking tape has a surface on the opposite side of the adhesive surface with a low surface roughness to reduce the adhesive strength with the adhesive surface of the masking tape, that is, to facilitate pulling out of the masking tape in some embodiments. Accordingly, also when the process to improve the adhesiveness with the easily peelable coating material is performed on the surface of the part in contact with the boundary of the masking tape, the step (ii) may be performed after the step (i). Since it is only necessary that the process to improve the adhesiveness with the easily peelable coating material is performed on the surface of the part over which the easily peelable coating material can be applied in the masking tape, the process to improve the adhesiveness with the easily peelable coating material may be performed not only on the surface of the part in contact with the boundary of the masking tape, but also on the surface of the whole masking tape.

Since the adhesive may not remain in the foundation layer over which the easily peelable coating material was applied, or the foundation layer may not have the unevenness after peeling off the easily peelable coating material, the process to improve the adhesiveness with the easily peelable coating material may be performed only on the surface of the part in contact with the boundary of the masking tape.

Since the adhesiveness between the surfaces of the part in contact with the boundary of the part to be coated and/or the part in contact with the boundary of the masking tape and the easily peelable coating material is improved by the step (ii), the more distinct, sharp, and clear parting line can be formed after peeling off the masking tape in the step (iv) described below.

(iii) Step of Applying Easily Peelable Coating Material Over Surface of Part to be Coated and Part in Contact with Boundary of Masking Tape (Easily Peelable Coating Material Applying Step)

In the step (iii), the easily peelable coating material is applied over the surfaces of the part to be coated and the part in contact with the boundary of the masking tape.

The easily peelable coating material includes a coating material known in the technical field, and is not limited. The easily peelable coating material includes, for example, a coating material selected from the group consisting of coating materials containing volatile solvents. Examples of the easily peelable coating material include a coating material containing an organic solvent, for example, xylene, ethylbenzene, and/or methyl ethyl ketone, an antioxidant, a silica reactant, a pigment, for example, titanium oxide (nanoparticles), and/or the like.

A method for applying the easily peelable coating material includes an applying method known in the technical field, and is not limited. Examples of the applying method include a manual application using a brush, a roller brush, a spatula, or the like, an application by equipment operation using an air spray, an airless spray, immersion, or the like, an application by device operation using adsorption by electrical attraction (electrostatic action).

In the step (iii), the easily peelable coating material is applied by a method with which the easily peelable coating material is uniformly and sufficiently applied over the part to be coated, especially, a part in contact with the parting part of the part to be coated in some embodiments.

The thickness of applying the easily peelable coating material is not limited. The easily peelable coating material is applied such that the thickness of the coating film after hardening the easily peelable coating material is usually from 20 μm to 150 μm, and from 40 μm to 80 μm in some embodiments.

By applying the easily peelable coating material in the step (iii), the easily peelable coating material is applied over the surfaces of the part to be coated and a part of the masking tape attached in the step (i), especially the part in contact with the parting part of the masking tape.

The step (iii) may further include (iii') a step of half-hardening or hardening the easily peelable coating material to decrease the fluidity (to increase the viscosity) of the easily peelable coating material.

The step of half-hardening or hardening the easily peelable coating material, that is, the step (iii') can differ depending on the property of the easily peelable coating material.

For example, when the easily peelable coating material contains a volatile solvent, for example, xylene, ethylbenzene, acetone, methyl ethyl ketone, or a mixed solvent of them, and the like, the step (iii') can include a step of flashing-off (simply, a step of "flashing" in other words) or a step of drying to volatilize the solvents. While the step of flashing-off or the step of drying is not limited, the step of flashing-off or the step of drying can be performed in the atmosphere at usually from 15° C. to 100° C., from 20° C. to 100° C. in some embodiments, from 15° C. to 80° C. in some embodiments, from 15° C. to 60° C. in some embodiments, from 40° C. to 60° C. in some embodiments, and from 20° C. to 50° C. in some embodiments. While a flash-off time or a drying time in the step of flashing-off or the step of drying possibly depends on the temperature in the step of flashing-off or the step of drying, the flash-off time or the drying time may be set to be shorter, usually 30 minutes or less, and 10 minutes or less in some embodiments. Since the excessively short flash-off time or drying time fails to half-harden or harden the easily peelable coating material, the flash-off time or the drying time is usually 30 seconds or more, one minute or more in some embodiments, and three minutes or more in some embodiments. While the process may proceed to the step (iv) directly, that is, in a state where the coating film is heated, after the step of flashing-off or the step of drying, the half-hardened or hardened easily peelable coating material (coating film) may be cooled to the room temperature (about 20° C. to 30° C.) from the aspect of stability of the coating film.

For example, the step (iii') can include a heat treatment step when the easily peelable coating material contains a thermosetting resin. The heat treatment step is performed for a period at a temperature enough to half-harden or harden the easily peelable coating material. While the process may directly proceed to the step (iv) after the heat treatment step, the half-hardened or hardened easily peelable coating material (coating film) may be cooled to the room temperature (about 20° C. to 30° C.) from the aspect of stability of the coating film.

For example, the step (iii') can include a light irradiation step when the easily peelable coating material contains a photocurable resin. The irradiation step is performed with a light wavelength for a period enough to half-harden or harden the easily peelable coating material. While the process may directly proceed to the step (iv) after the irradiation step, the half-hardened or hardened easily peelable coating material (coating film) may be cooled to the room temperature (about 20° C. to 30° C.) from the aspect of stability of the coating film.

When the step (iii) further includes the step (iii'), the fluidity of the easily peelable coating material is decreased (the viscosity is increased) to stabilize the coating film, thus allowing to avoid dropping of the easily peelable coating material on the foundation layer even when the masking tape is peeled off in the step (iv) described below.

Figure 2A:
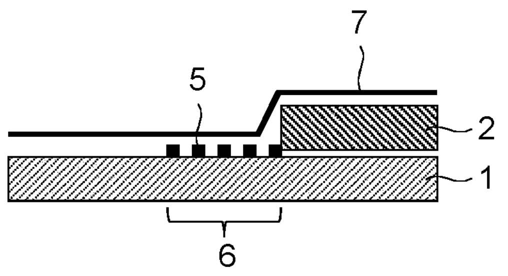
FIGS. 2A to 2C are drawings schematically illustrating an example of a method for forming a parting line in a coating using an easily peelable coating material according to the disclosure.
Figure 2B:
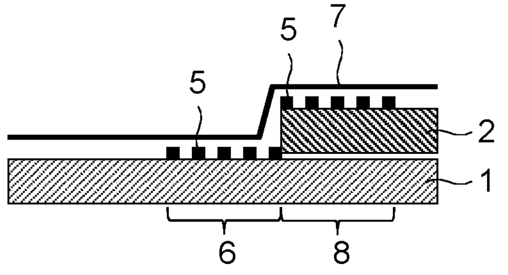
Figure 2C:
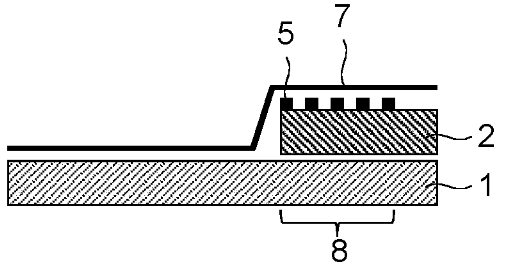

FIGS. 2A to 2C schematically illustrate states in the step (iii) of the present disclosure. FIG. 2A illustrates a state where a process 5 to improve the adhesiveness with the easily peelable coating material is performed on a surface of a part 6 in contact with the boundary of the part to be coated, and subsequently, an easily peelable coating material 7 is applied in the step (ii). FIG. 2B illustrates a state where the process 5 to improve the adhesiveness with the easily peelable coating material is performed on the surface of the part 6 in contact with the boundary of the part to be coated and a surface of a part 8 in contact with the boundary of the masking tape 2, and subsequently, the easily peelable coating material 7 is applied in the step (ii). FIG. 2C illustrates a state where the process 5 to improve the adhesiveness with the easily peelable coating material is performed on the surface of the part 8 in contact with the boundary of the masking tape 2, and subsequently, the easily peelable coating material 7 is applied in the step (ii).

(iv) Step of Peeling Off Masking Tape (Masking Tape Peeling Off Step)

In the step (iv), the masking tape is peeled off.

In the peeling off the masking tape in the step (iv), since the process to improve the adhesiveness with the easily peelable coating material is performed on the surfaces of the part in contact with the boundary of the part to be coated and/or the part in contact with the boundary of the masking tape in the step (ii), the easily peelable coating material in the part in contact with the boundary of the part to be coated does not lift even when peeling off the masking tape, thus allowing the formation of the sharp and clear parting line.

Furthermore, in the step (iv), the masking tape may be peeled off along the parting line in the pull direction of usually from 160° to 200°, and the pull direction of 180° (180° opposite direction) in some embodiments with the pull angle of usually from 160° to 180°, and the pull angle of 180° in some embodiments.

In the step (iv), some embodiments in which "the masking tape is peeled off along the parting line in the pull direction of 180° with the pull angle of 180°" mean that, in other words, the masking tape is peeled off by holding up the end of the masking tape and folding back the masking tape in the pull direction of 180° (180° opposite direction) with the pull angle of 180° (in a state of lying in the opposite direction) along the parting line, that is, such that the peeled part of the masking tape is along a still adhering part of the masking tape.

The pull direction means, similarly to the above description, an angle between the parting line formed by peeling off the masking tape and a part that was in contact with the parting line in the peeled part of the masking tape at a boundary (folded portion) between the peeled part and the unpeeled part of the masking tape on the parting line viewed from directly above the coated surface.

The pull angle means, similarly to the above description, an angle between the distal end portion of the masking tape before peeled off and the distal end portion of the peeled masking tape at a boundary (folded portion) between the peeled part and the unpeeled part of the masking tape when the coated surface is viewed edge-on.

That is, "peeling off the masking tape in the pull direction of 180° with the pull angle of 180°" means that the peeled distal end portion of the masking tape is folded back so as to overlap the still adhering part of the masking tape, and peeled off in the lying state as it is.

By peeling off the masking tape as described above in the step (iv) of the present disclosure, the easily peelable coating material in the part in contact with the boundary of the part to be coated does not lift even when peeling off the masking tape, thus allowing the formation of the sharper and clearer parting line.

EXAMPLES

While the following describes some examples relating to the present disclosure, it is not intended to limit the present disclosure to the examples.

1. Examination of Masking Tape Peeling Off Step

Figure 3A:
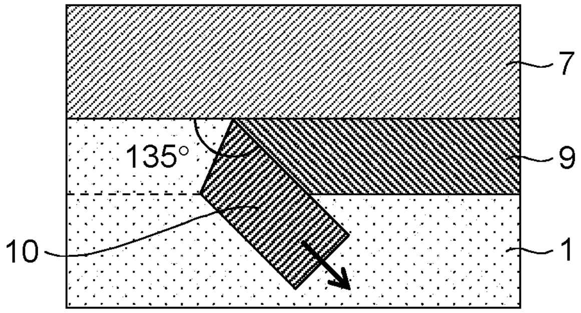
FIGS. 3A to 3D are drawings schematically illustrating the method for forming a parting line in a coating using an easily peelable coating material according to Comparative Examples 1 to 3 and Example 1.
Figure 3B:
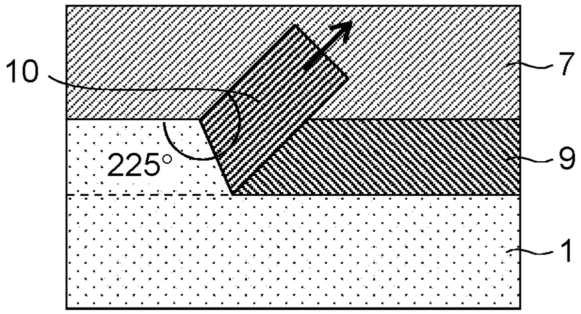
Figure 3C:
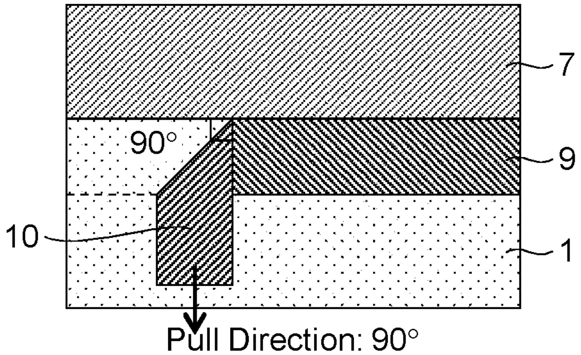
Figure 3D:
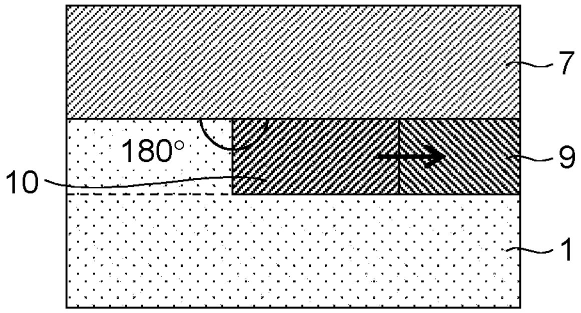

Based on the peeling off methods (views from immediately above coated surface) illustrated in FIG. 3A (Comparative Example 1), FIG. 3B (Comparative Example 2), FIG. 3C (Comparative Example 3), and FIG. 3D (Example 1), the parting line was formed in the coating using the easily peelable coating material. In FIGS. 3A to 3D, Reference numeral 1 denotes the foundation layer, Reference numeral 7 denotes the easily peelable coating material (coating film), Reference numeral 9 denotes the surface (before peeling off) of the masking tape, and Reference numeral 10 denotes a backside surface (after peeling off) of the masking tape.

Comparative Example 1

(I) Masking Step

The masking tape was attached to the part not to be coated on the boundary between the part to be coated and the part not to be coated along the boundary.

(II) Easily Peelable Coating Material Applying Step

The easily peelable coating material was applied over the surfaces of the part to be coated and the part in contact with the parting part of the masking tape by spraying, and dried. As the easily peelable coating material, a commercially available coating material having a peelable property (coating material containing volatile solvent) was used.

(III) Masking Tape Peeling Off Step

The masking tape to which the easily peelable coating material was attached in the step (II) was peeled off in the pull direction of 135° with the pull angle of 180° as illustrated in FIG. 3A, thereby forming the parting line. As the foundation layer, the coated surface was used.

Comparative Example 2

The parting line was formed similarly to the method of Comparative Example 1 except that the parting line was formed by peeling off the masking tape to which the easily peelable coating material was attached in the step (II) in the pull direction of 225° with the pull angle of 180° as illustrated in FIG. 3B in (III) Masking Tape Peeling off Step of Comparative Example 1.

Comparative Example 3

The parting line was formed similarly to the method of Comparative Example 1 except that the parting line was formed by peeling off the masking tape to which the easily peelable coating material was attached in the step (II) in the pull direction of 90° with the pull angle of 180° as illustrated in FIG. 3C in (III) Masking Tape Peeling off Step of Comparative Example 1.

Example 1

The parting line was formed similarly to the method of Comparative Example 1 except that the parting line was formed by peeling off the masking tape to which the easily peelable coating material was attached in the step (II) in the pull direction of 180° with the pull angle of 180° as illustrated in FIG. 3D in (III) Masking Tape Peeling off Step of Comparative Example 1.

As the results of Comparative Examples 1 to 3 and Example 1, the parting line of Example 1 was a parting line that was less jagged, more distinct, sharp, and clear compared with the parting lines of Comparative Examples 1 to 3.

2. Examination of Adhesiveness Improving Step

Based on steps (i) to (iv) below, the parting line was formed in the coating using the easily peelable coating material.

2-1. Examination of Processing Method in Adhesiveness Improving Step

Example 2

(i) Masking Step

The masking tape was attached to the part not to be coated on the boundary between the part to be coated and the part not to be coated along the boundary. As the foundation layer, the coated surface was used.

(ii) Adhesiveness Improving Step

The adhesive application process was performed on the surface (coating surface) of the part in contact with the boundary of the part to be coated as the process to improve the adhesiveness with the easily peelable coating material. As the adhesive, a PP primer or Mitchacron was used.

(iii) Easily Peelable Coating Material Applying Step

The easily peelable coating material was applied over the surfaces of the part to be coated and the part in contact with the parting part of the masking tape by spraying. As the easily peelable coating material, a commercially available coating material having a peelable property (coating material containing volatile solvent) was used. After applying the easily peelable coating material by spraying, drying was performed.

(iv) Masking Tape Peeling Off Step

After the drying, the masking tape to which the easily peelable coating material was attached in the step (iii) was peeled off in the pull direction of 135° with the pull angle of 180° before cooling, thereby forming the parting line.

As the result of Example 2, the parting line of Example 2 was a parting line that was less jagged, more distinct, sharp, and clear compared with the parting lines formed without performing the step (ii). In Example 2, the used adhesive remained on the foundation layer when the easily peelable coating material was further peeled off after the step (iv).

Example 3

The parting line was formed similarly to the method of Example 2 except that the adhesive application process as the process to improve the adhesiveness with the easily peelable coating material was changed to the roughening process [sandpaper of #600, #1000, #1500, #2000, #3000 or #5000, or roughening compound, or fine particle compound, normal (indicating a general polishing work), firm (indicating a polishing work performed so as to degloss the foundation layer) in (ii) adhesiveness improving step of Example 2. Table 1 indicates the result of Example 3.

TABLE 1

| | Roughening Degree | | Judging Factor | | | |
|---|---|---|---|---|---|---|
| Roughening Treatment | Normal | Firm | Appearance Finish | Roughening Workability | Subsequent Operation | Edge Adhesive Strength After Peeling off |
| #600 | ■ | | Poor | — | — | — |
| #1000 | ■ | | Poor | — | — | — |
| #1500 | ■ | | Poor | — | — | — |
| Roughening Compound | ■ | | Poor | — | — | — |
| Fine Particle Compound | ■ | | Poor | — | — | — |
| #2000 | ■ | | Poor | — | — | — |
| | | ■ | Good | Good | Poor | Good |
| #3000 | ■ | | Poor | — | — | — |
| | | ■ | Good | Good | Fair | Good |
| #5000 | | ■ | Fair | Good | Good | Fair |

In Table 1, for the finish, "Poor" means that the parting line was jagged, "Fair" means that the parting line was a mixture of jaggedness and sharpness, and "Good" means that the parting line was sharp and uniform. For the roughening workability, "Fair" means that the roughening process was firmly performed, and "Good" means that the roughening process was performed firmly and smoothly. For the subsequent operation, "Poor" means that the unevenness of the foundation layer was remarkable when the easily peelable coating material was further peeled off after the step (iv), "Fair" means that the unevenness of the foundation layer was not so much remarkable when the easily peelable coating material was further peeled off after the step (iv), and "Good" means that the unevenness of the foundation layer was unremarkable when the easily peelable coating material was further peeled off after the step (iv). For the edge adhesive strength after peeling off, "Poor" means that the edge of the easily peelable coating material had the adhesive strength after the step (iv), and "Good" means that the edge of the easily peelable coating material had the high adhesive strength after the step (iv). Note that the sign "-" in the judging factors means that the roughening process was not performed because it was found that the uniform roughening process took a long time.

As the result of Example 3, the parting line of Example 3 was a parting line that was less jagged, more distinct, sharp, and clear compared with the parting lines formed without performing the step (ii). Furthermore, it was seen from Table 1 that in the roughening process of Example 3, since firmly performing the roughening process took a long time when the sandpapers of from #600 to #1500 as the sandpaper and the compounds were used, the sandpapers of from #2000 to #5000, especially from #3000 to #5000 were appropriate as the sandpaper.

In the roughening process, the type of the sandpaper or the compound to be used can be changed corresponding to the type of the foundation layer, and it was found that the sandpapers of from #2000 to #5000, especially from #3000 to #5000 were appropriate for the roughening process when the coated surface was used for the foundation layer.

2-2. Examination of Processed Part in Adhesiveness Improving Step

Example 4

The parting line was formed similarly to the method of Example 3 except that the roughening process (sandpaper of #3000, normal) was performed on the surfaces of the part in contact with the boundary of the part to be coated and the part in contact with the boundary of the masking tape (masking and coating surface) in (ii) Adhesiveness Improving Step of Example 3.

Example 5

The parting line was formed similarly to the method of Example 3 except that the roughening process (sandpaper of #3000, firm) was performed on the surfaces of the part in contact with the boundary of the part to be coated and the part in contact with the boundary of the masking tape (masking and coating surface) in (ii) Adhesiveness Improving Step of Example 3.

Example 6

The parting line was formed similarly to the method of Example 3 except that the roughening process (sandpaper of #3000, normal) was performed on the surface of the part in contact with the boundary of the masking tape (masking) in (ii) Adhesiveness Improving Step of Example 3.

Example 7

The parting line was formed similarly to the method of Example 3 except that the roughening process (sandpaper of #3000, firm) was performed on the surface of the part in contact with the boundary of the masking tape (masking) in (ii) Adhesiveness Improving Step of Example 3.

Example 8

The parting line was formed similarly to the method of Example 3 except that the roughening process (sandpaper of #5000, firm) was performed on the surfaces of the part in contact with the boundary of the part to be coated and the part in contact with the boundary of the masking tape (masking and coating surface) in (ii) Adhesiveness Improving Step of Example 3.

Example 9

The parting line was formed similarly to the method of Example 3 except that the roughening process (sandpaper of #5000, firm) was performed on the surface of the part in contact with the boundary of the masking tape (masking) in (ii) Adhesiveness Improving Step of Example 3. Table 2 indicates the results of Examples 3 to 9.

TABLE 2

| | Roughening Degree | | Roughening Part | | | Judging Factor | | | |
|---|---|---|---|---|---|---|---|---|---|
| | | | Coating | Masking and Coating | | Appearance | Roughening | Subsequent | Edge Adhesive Strength |
| Example | Normal | Firm | Surface | Surface | Masking | Finish | Workability | Operation | After Peeling off |
| Example 3 (#3000) | | ■ | ■ | | | Good | Good | Fair | Good |
| Example 4 (#3000) | ■ | | | ■ | | Poor | Fair | Good | Fair |
| Example 5 (#3000) | | ■ | | ■ | | Excellent | Fair | Fair | Excellent |
| Example 6 (#3000) | ■ | | | | ■ | Poor | Excellent | Excellent | Fair |
| Example 7 (#3000) | | ■ | | | ■ | Excellent | Excellent | Excellent | Good |
| Example 3 (#5000) | | ■ | ■ | | | Fair | Good | Good | Fair |

TABLE 2-continued

| | Roughening Degree | | Roughening Part | | | | Judging Factor | | |
|---|---|---|---|---|---|---|---|---|---|
| Example | Normal | Firm | Coating Surface | Masking and Coating Surface | Masking | Appearance Finish | Roughening Workability | Subsequent Operation | Edge Adhesive Strength After Peeling off |
| Example 8 (#5000) | | ■ | | ■ | | Fair | Fair | Good | Fair |
| Example 9 (#5000) | | ■ | | | ■ | Fair | Excellent | Excellent | Fair |

In Table 2, for the finish, "Fair" means that the parting line was a mixture of jaggedness and sharpness, "Good" means that the parting line was sharp and uniform, and "Excellent" means that the parting line was sharper and more uniform. For the roughening workability, "Fair" means that the roughening process was firmly performed, "Good" means that the roughening process was performed firmly and smoothly, and "Excellent" means that the roughening process was performed firmly and more smoothly. For the subsequent operation, "Fair" means that the unevenness of the foundation layer was not so much remarkable when the easily peelable coating material was further peeled off after the step (iv), "Good" means that the unevenness of the foundation layer was unremarkable when the easily peelable coating material was further peeled off after the step (iv), and "Excellent" means that the unevenness of the foundation layer was more unremarkable when the easily peelable coating material was further peeled off after the step (iv). For the edge adhesive strength after peeling off, "Fair" means that the edge of the easily peelable coating material had the adhesive strength after the step (iv), "Good" means that the edge of the easily peelable coating material had the high adhesive strength after the step (iv), and "Excellent" means that the edge of the easily peelable coating material had the higher adhesive strength after the step (iv).

From Table 2, it was seen that Examples 5, 7, and 9, especially Example 7 were excellent for the appearance and the judging factors.

Table 3 indicates the roughening condition, the appearance, and the judging factors of Examples 2, 3, 5, 7, 8, and 9 (Examples of roughening (adhesion) degree of "firm").

In Table 3, for the finish, "Fair" means that the parting line was a mixture of jaggedness and sharpness, "Good" means that the parting line was sharp and uniform, and "Excellent" means that the parting line was sharper and more uniform. For the roughening workability, "Fair" means that the roughening process was firmly performed, "Good" means that the roughening process was performed firmly and smoothly, and "Excellent" means that the roughening process was performed firmly and more smoothly. For the subsequent operation, "Poor" means that the adhesive on the foundation layer remained or the unevenness was remarkable when the easily peelable coating material was further peeled off after the step (iv), "Fair" means that the unevenness of the foundation layer was not so much remarkable when the easily peelable coating material was further peeled off after the step (iv), "Good" means that the unevenness of the foundation layer was unremarkable when the easily peelable coating material was further peeled off after the step (iv), and "Excellent" means that the unevenness of the foundation layer was more unremarkable when the easily peelable coating material was further peeled off after the step (iv). For the edge adhesive strength after peeling off, "Fair" means that the edge of the easily peelable coating material had the adhesive strength after the step (iv), "Good" means that the edge of the easily peelable coating material had the high adhesive strength after the step (iv), and "Excellent" means that the edge of the easily peelable coating material had the higher adhesive strength after the step (iv).

TABLE 3

| | Roughening | Roughening Part | | | | Judging Factor | | |
|---|---|---|---|---|---|---|---|---|
| Example | (Adhesion) Degree Firm | Coating Surface | Masking and Coating Surface | Masking | Appearance Finish | Roughening Workability | Subsequent Operation | Edge Adhesive Strength After Peeling off |
| Example 2 | ■ | ■ | | | Excellent | Fair | Poor (Remain) | Excellent |
| Example 3 (#2000) | ■ | ■ | | | Good | Good | Poor | Good |
| Example 3 (#3000) | ■ | ■ | | | Good | Good | Fair | Good |
| Example 5 (#3000) | ■ | | ■ | | Excellent | Fair | Fair | Excellent |
| Example 7 (#3000) | ■ | | | ■ | Excellent | Excellent | Excellent | Good |
| Example 3 (#5000) | ■ | ■ | | | Fair | Good | Good | Fair |
| Example 8 (#5000) | ■ | | ■ | | Fair | Fair | Good | Fair |
| Example 9 (#5000) | ■ | | | ■ | Fair | Excellent | Excellent | Fair |

2-3. Examination of Easily Peelable Coating Material Applying Step

The easily peelable coating material applying step was examined in the method for forming a parting line including the adhesiveness improving step.

Example 10

The parting line was formed similarly to the method of Example 3 except that the sandpaper of #3000 (firm) was used for the roughening process in (ii) Adhesiveness Improving Step of Example 3, and cooling was performed after drying (that is, the easily peelable coating material was applied, dried, and cooled, and subsequently, the step (iv) was performed) in (iii) Easily Peelable Coating Material Applying Step of Example 3.

Example 11

The parting line was formed similarly to the method of Example 5 except that cooling was performed after drying (that is, the easily peelable coating material was applied, dried, and cooled, and subsequently, the step (iv) was performed) in (iii) Easily Peelable Coating Material Applying Step of Example 5.

Example 12

The parting line was formed similarly to the method of Example 7 except that cooling was performed after drying (that is, the easily peelable coating material was applied, dried, and cooled, and subsequently, the step (iv) was performed) in (iii) Easily Peelable Coating Material Applying Step of Example 7.

Example 13

The parting line was formed similarly to the method of Example 3 except that the sandpaper of #5000 (firm) was used for the roughening process in (ii) Adhesiveness Improving Step of Example 3, and cooling was performed after drying (that is, the easily peelable coating material was applied, dried, and cooled, and subsequently, the step (iv) was performed) in (iii) Easily Peelable Coating Material Applying Step of Example 3.

Example 14

The parting line was formed similarly to the method of Example 8 except that cooling was performed after drying (that is, the easily peelable coating material was applied, dried, and cooled, and subsequently, the step (iv) was performed) in (iii) Easily Peelable Coating Material Applying Step of Example 8.

Example 15

The parting line was formed similarly to the method of Example 9 except that cooling was performed after drying (that is, the easily peelable coating material was applied, dried, and cooled, and subsequently, the step (iv) was performed) in (iii) Easily Peelable Coating Material Applying Step of Example 9.

The parting lines of Examples 10 to 15 were parting lines that were more distinct, sharp, and clear compared with the parting lines of corresponding Examples 3, 5, and 7 to 9.

Accordingly, it was found that in the method for forming a parting line including the adhesiveness improving step, the masking tape peeling off step was performed after the easily peelable coating material was dried, subsequently cooled, and a stable coating film state was formed in some embodiments.

2-4. Examination of Masking Tape Peeling Off Step

In the method for forming a parting line including the adhesiveness improving step, the masking tape peeling off step was examined.

Example 16

The parting line was formed similarly to the method of Example 10 except that the pull direction was changed to 180° in (iv) masking tape peeling off step of Example 10.

Example 17

The parting line was formed similarly to the method of Example 11 except that the pull direction was changed to 180° in (iv) masking tape peeling off step of Example 11.

Example 18

The parting line was formed similarly to the method of Example 12 except that the pull direction was changed to 180° in (iv) masking tape peeling off step of Example 12.

The parting lines of Examples 16 to 18 were parting lines that were more distinct, sharp, and clear compared with the parting lines of corresponding Examples 10 to 12. Accordingly, it was found that the result similar to the result obtained in 1. Examination of Masking Tape Peeling off Step was obtained also in the method for forming a parting line including the adhesiveness improving step.

All publications, patents and patent applications cited in the present description are herein incorporated by reference as they are.

What is claimed is:

1. A method for forming a parting line in a coating using an peelable coating material, the method comprising:

(i) attaching a masking tape on a part not to be coated on a boundary between a part to be coated and the part not to be coated, along the boundary;

(ii) performing a process to improve an adhesiveness with the peelable coating material on a surface of a part in contact with the boundary of the part to be coated and/or a part in contact with the boundary of the masking tape;

(iii) applying the peelable coating material over surfaces of the part to be coated and the part in contact with the boundary of the masking tape; and (iv) peeling off the masking tape, wherein the process of improving the adhesiveness with the peelable coating material is a roughening process performed on only the surface, of the part, in contact with the boundary of the masking tape.

2. The method according to claim 1, wherein the step (iii) includes half-hardening or hardening the peelable coating material and cooling the peelable coating material.

3. The method according to claim 1, wherein in the step (iv), the masking tape is peeled off along the parting line in a pull direction of from 160° to 200° with a pull angle of from 160° to 180°.

4. The method according to claim 1, wherein the part in contact with the boundary of the masking tape is formed by the masking tape.

* * * * *